May 25, 1926.
S. B. HASELTINE
1,585,710
FRICTION SHOCK ABSORBING MECHANISM
Filed Dec. 10, 1924  2 Sheets-Sheet 2
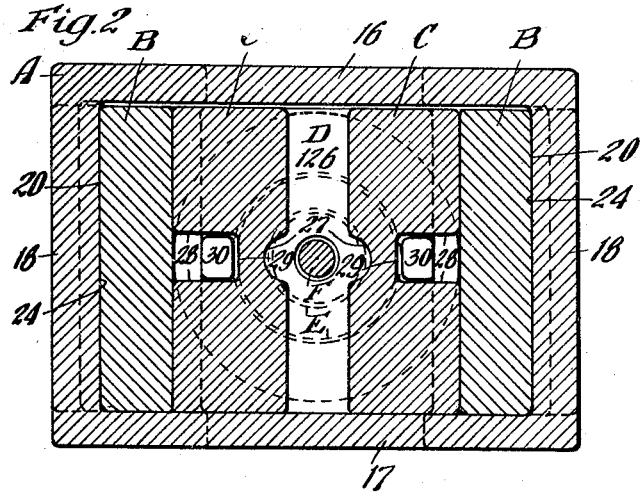
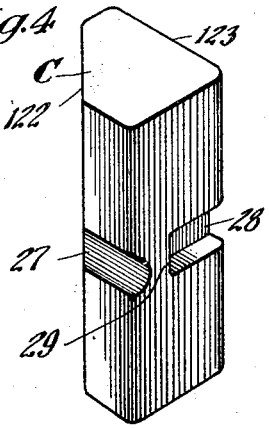
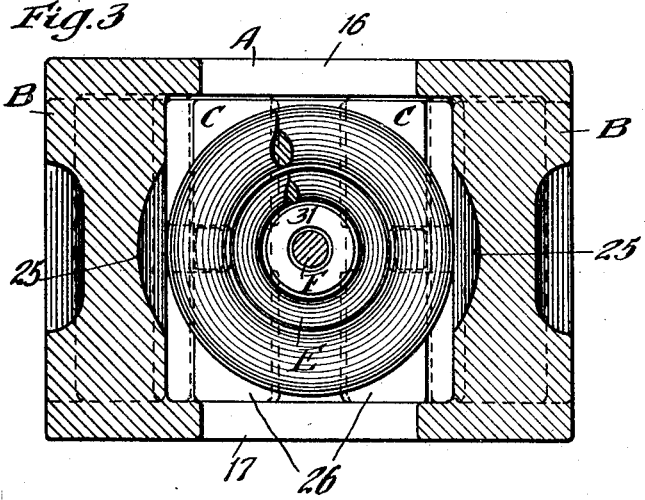
Witnesses
Wm. Geiger
Inventor
Stacy B. Haseltine
By George D. Haight
His Atty.

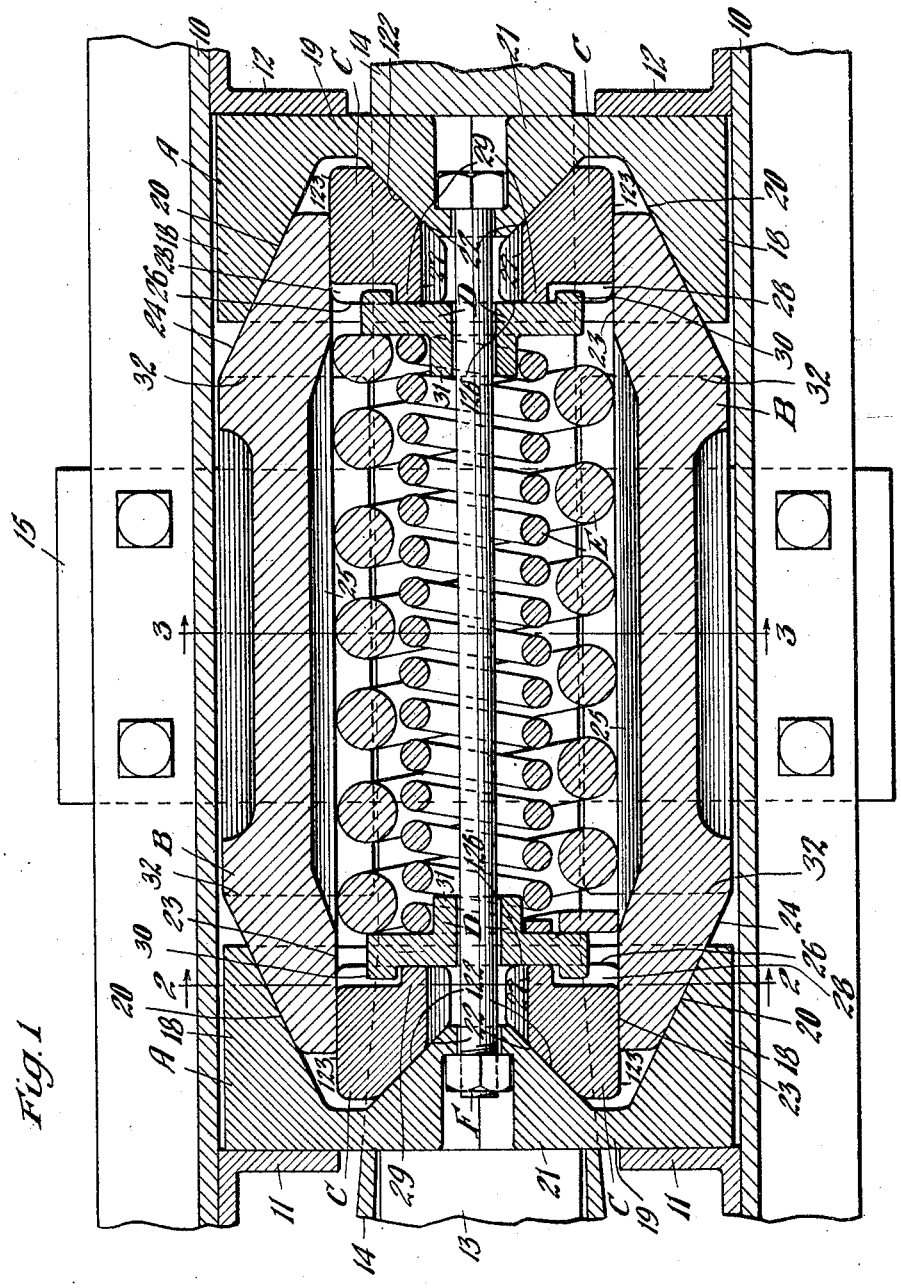

Patented May 25, 1926.

1,585,710

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed December 10, 1924. Serial No. 754,886.

This invention relates to friction shock absorbing mechanisms.

One object of the invention is to provide a friction shock absorbing mechanism especially adapted for railway draft riggings, wherein is provided high capacity and certain release.

Another object of the invention is to provide a friction shock absorbing mechanism of the character indicated, of simple construction wherein a multiplied or differential action of certain of the friction elements is had, so as to effect a greater spring compression than the actual travel of the actuating element.

A further object of the invention is to provide a shock absorbing mechanism including follower acting members; side members and a plurality of shoes having frictional engagement with the side members, wherein the main followers, side members and shoes are provided wth co-acting means adapted upon approach of the followers to simultaneously effect relative approach of the side members and longitudinal movement of the shoes on the side members.

Still another and more specific object of the invention is to provide a mechanism of the character indicated including main follower acting members and a plurality of sets of inter-engaging wedge friction elements, wherein the followers and friction elements are provided with co-acting wedge faces for simultaneously effecting relative approach of the friction elements of each set and relative movement longitudinally of the mechanism of the members of one set on the members of the other set.

Other and further objects and advantages of the invention will more clearly and fully appear from the description and claims hereinafter following.

In the drawings forming a part of this specification, Figure 1 is a horizontal, longitudinal, sectional view of a railway draft rigging showing my improvements in connection therewith. Figures 2 and 3 are vertical, transverse, sectional views corresponding respectively to the lines 2—2 and 3—3 of Fig. 1. And Figure 4 is a detailed perspective view of one of the wedge blocks.

In said drawings, 10—10 denote channel-shaped center or draft sills of a railway car underframe to the inner faces of which are secured front stop lugs 11—11 and rear stop lugs 12—12. A portion of the drawbar is indicated at 13, the same being operatively associated with a hooded yoke 14, wherein is disposed the shock absorbing mechanism proper. The yoke and shock absorbing mechanism therewithin are supported in operative position by a detachable saddle plate 15. The improved shock absorbing mechanism proper, as shown, comprises broadly front and rear follower acting members A—A; a pair of side members B—B; front and rear pairs of wedge blocks C—C; front and rear spring followers D—D; a spring resistance E; and a retainer bolt F.

The front and rear main follower members A are of like construction and are adapted to co-act with the front and rear stop lugs respectively. Each of said followers comprises top and bottom walls 16 and 17, side walls 18—18 and an end wall 19. The side walls 18 are provided with inwardly diverging faces 20 adapted to co-operate with the side members. Between the side walls 18 each follower A is provided with a central projection 21 having wedge faces 22 on the opposite sides thereof converging inwardly of the mechanism.

The side members B are of like construction, each being in the form of an elongated heavy plate having a flat, longitudinally disposed friction surface 23 on the inner side thereof, and inclined outer wedge surfaces 24 at the opposite ends thereof adapted to cooperate with the respective faces 20 of the front and rear followers and correspondingly inclined thereto. On the inner side each side member is longitudinally recessed as indicated at 25 to accommodate the corresponding side of the spring resistance element E.

The wedge blocks C which are four in number, are arranged in pairs at opposite ends of the mechanism. As most clearly shown in Fig. 4, each wedge block has a flat surface 123 on one side thereof adapted to cooperate with the friction surface 23 of the corresponding side member. At the outer end, each block C is provided with a wedge face 122 adapted to cooperate with the wedge face 22 at the corresponding side of the projection 21 of one of the followers A. At the inner end, each block C has a transverse flat surface 26 adapted to cooperate with the corresponding spring follower D. On the side nearest adjacent the central axis of the mechanism, each shoe is longitudinally recessed as indicated at 27 to accommodate the side of the retainer bolt F when the shoes are moved toward each other. The transverse inner end of each block C is recessed as indicated at 28, thereby providing a guideway for a purpose hereinafter described.

The spring followers D are arranged at opposite ends of the mechanism and are of like construction. Each spring follower D is provided with a flat outer face 126 adapted to cooperate with the faces 26 of the corresponding pair of wedge blocks C. Each spring follower D is also provided with a pair of lugs 30 at opposite sides thereof, adapted to work within the corresponding guide ways 28 of the block C to prevent turning of the followers about the axis of the gear, and avoid interference with other parts. On the inner side, each spring follower is provided with a central boss 31 adapted to engage within corresponding end of the innermost coil of the spring resistance E, to properly center the same.

The main spring resistance E comprises a relatively heavy outer coil and a relatively lighter inner coil, the two coils having their opposite ends bearing on the spring followers.

The mechanism is held under initial compression and of uniform overall length by the retainer bolt F which has the opposite ends thereof anchored to the front and rear followers A respectively, the followers being recessed to accommodate the head and nut of the bolt.

The operation of the mechanism during a compression stroke is as follows. As the front and rear followers A are moved relatively toward each other, the side members B are forced laterally inwardly toward each other, carrying the corresponding wedge blocks C laterally inwardly therewith. As the blocks C approach each other laterally, the same will be forced to move longitudinally inwardly of the mechanism due to the wedging action between the faces 22 and 122. Simultaneously with this movement, the blocks C will also be forced inwardly longitudinally of the mechanism due to being carried inwardly by the followers during their relative approaching movement. A differential action will thus be produced, the shoes of the front and rear pairs moving inwardly toward each other longitudinally of the mechanism at a greater rate than the front and rear followers, compressing the main spring resistance. It will be evident that in addition to the frictional resistance between the faces 24 and 30 of the side members and followers A, the friction surfaces 23 and 123 of the side members and wedge blocks C and the wedge surfaces 122 and 22 of the blocks and the followers A, friction will be created between the surfaces 26 and 126 of the blocks and spring followers E, as the blocks C approach each other laterally. The relative approach of the front and rear followers A will be limited by engagement of the inner ends thereof with transverse shoulders 32 provided adjacent the front and rear ends respectively of the side members B, thereby preventing the main spring resistance from being driven solid, the front and rear followers A and the side members B forming in effect a solid column for transmitting the force directly to the stop lugs of the draft sills. Upon reduction of the actuating force, the main spring resistance will return all the parts to normal position.

While I have herein shown and described what I now consider the preferred manner of carrying out my invention, the same is merely illustrative and I contemplate all changes and modifications that come within the scope of the claims appended hereto.

What I claim is:

1. In a friction shock absorbing mechanism, the combination with front and rear, relatively movable main followers; of side members having longitudinally disposed friction surfaces; friction shoes engaging the friction surfaces of said side members; cooperating means on said side members and front and rear followers for effecting lateral approach of said side members and shoes upon movement of said followers toward each other; cooperating means on said shoes and followers for forcing said shoes against said side members and effecting movement of the shoes longitudinally of said side members; and a spring resistance means cooperating with said shoes.

2. In a friction shock absorbing mechanism, the combination with side members having longitudinally disposed friction surfaces on the inner sides thereof and having outer wedge faces at the opposite ends thereof; of two sets of friction shoes disposed between said side members cooperating with the friction surfaces thereof, said sets being disposed at opposite ends of said members, and each shoe having a wedge face on the inner side thereof; a pair of follower elements disposed at the opposite ends of said side members, said followers being movable relatively toward each other, and each having a plurality of wedge faces cooperating with the corresponding faces of said members and shoes; and a main spring resistance interposed between said two sets of shoes.

3. In a friction shock absorbing mechanism, the combination with side members having longitudinally disposed friction surfaces on the inner sides thereof and having outer wedge faces at the opposite ends thereof; of two sets of friction shoes disposed between said side members cooperating with the friction surfaces thereof; said sets being disposed at opposite ends of said members, and each shoe having a wedge face on the inner side thereof; a pair of follower elements disposed at the opposite ends of said side members, said followers being movable relatively toward each other, and each having a plurality of wedge faces cooperating with the corresponding faces of said members and shoes; a spring follower cooperating with each set of shoes, said spring followers and shoes having cooperating friction surfaces; and a main spring resistance interposed between said spring followers.

4. In a friction shock absorbing mechanism, the combination with side members having longitudinally disposed friction surfaces on the inner sides thereof; of a plurality of friction shoes disposed between said side members cooperating with the friction surfaces thereof; a follower-acting element disposed at one end of said members, said follower having wedging engagement with said side members and shoes; a second follower-acting element cooperating with the opposite ends of said side members, said follower-acting elements being movable longitudinally toward each other; and a main spring resistance opposing movement of said shoes.

In witness that I claim the foregoing I have hereunto subscribed my name this 5th day of December, 1924.

STACY B. HASELTINE.